United States Patent [19]

Hamdan

[11] Patent Number: 5,081,702
[45] Date of Patent: Jan. 14, 1992

[54] METHOD AND APPARATUS FOR PROCESSING MORE THAN ONE HIGH SPEED SIGNAL THROUGH A SINGLE HIGH SPEED INPUT TERMINAL OF A MICROCONTROLLER

[75] Inventor: Majed M. Hamdan, North Olmsted, Ohio

[73] Assignee: Allied-Signal Inc., Morristown, N.J.

[21] Appl. No.: 321,050

[22] Filed: Mar. 9, 1989

[51] Int. Cl.⁵ .............................................. G06F 7/00
[52] U.S. Cl. .............................. 395/725; 364/426.01
[58] Field of Search ... 364/200 MS File, 900 MS File, 364/426.01

[56] References Cited

U.S. PATENT DOCUMENTS

| | | | |
|---|---|---|---|
| 3,665,405 | 5/1972 | Sanders et al. | 370/105.1 |
| 4,573,120 | 2/1986 | Ichimiya et al. | 364/200 |
| 4,731,746 | 3/1988 | Nozeran et al. | 364/565 |
| 4,987,535 | 1/1991 | Takayama | 364/200 |

FOREIGN PATENT DOCUMENTS

| | | |
|---|---|---|
| 0187063 | 7/1986 | European Pat. Off. |
| 2045950 | 11/1980 | United Kingdom . |
| 2054299 | 2/1981 | United Kingdom . |

OTHER PUBLICATIONS

"Microcomputer Technology for Truck and Vehicle Applications" L. Smith, *Electronic Technologies & Systems for Commercial Behicles of the 80s*, Nov. 1981, pp. 1-7.

Primary Examiner—Allen R. MacDonald
Assistant Examiner—Debra A. Chun
Attorney, Agent, or Firm—Ken C. Decker; William N. Antonis

[57] ABSTRACT

A method and apparatus for processing two high speed signals through a single high speed input terminal of a microprocessor uses a multiplexing circuit connected between the signal conditioners from the wheel speed sensor and the microprocessor. The multiplexing circuit converts the square wave signal as generated by the signal conditioning circuits into a series of interrupts. The multiplexing circuit includes three hardware semaphores or flip-flops which are set by the interrupts generated from wheel speed signals. The semaphores or flip-flops are reset by the microprocessor.

10 Claims, 2 Drawing Sheets ial illustration of the microprocessor 12 in FIG. 1.

METHOD AND APPARATUS FOR PROCESSING MORE THAN ONE HIGH SPEED SIGNAL THROUGH A SINGLE HIGH SPEED INPUT TERMINAL OF A MICROCONTROLLER

This invention relates to a method and apparatus for processing more than one high speed signal through a single high speed input terminal of a microprocessor.

Modern automotive vehicles are commonly equipped with control systems, such as adaptive braking systems and traction control systems, which require processing of high speed input signals by a microprocessor in order to effect control of the corresponding vehicle system. Most such microprocessors are designed for use on passenger cars. Since passenger cars have but four wheels, most existing microprocessors are equipped with four high speed input terminals so that, for example, wheel speed from each of the vehicle's wheels may be used by the microprocessor in order to effect the aforementioned system controls. Although the present invention is particularly concerned with processing wheel speeds for use in adaptive braking and traction control systems, the invention should not be construed to be limited to automotive electronics. In fact, many other systems, such as those used with machine tools, also require processing of multiple high speed signals, and the present invention can also be used with such systems.

Although conventional microprocessors are available for passenger cars, heavy vehicles (such as heavy duty trucks) may also be equipped with adaptive braking and/or adaptive traction systems. However, such systems on heavy duty trucks commonly require processing of more than four high speed signals. In view of the volumes involved, design of a microprocessor specifically for heavy duty trucks with more than four high speed input terminals is prohibitively expensive, so systems designers have commonly provided two or more microcontrollers so that the necessary high speed input terminals could be provided.

However, use of multiple microprocessors in a single system has adverse implications. Of course, the microprocessor is normally the single most expensive component of the system, by a substantial margin. Accordingly, use of multiple processors substantially increases system cost. However, since it is necessary for the microprocessors to "talk" to one another, additional hardware and software complexities are introduced into the system, thereby even further increasing the system cost. Accordingly, it is desirable to use a single microprocessor, but only if a microprocessor of an existing design having four high speed inputs can be used to process multiple wheel speeds on a single high speed input terminal. The present invention solves this problem by providing a multiplexing arrangement to enable two or more high speed input signals to be processed through the same high speed input terminal of a microprocessor.

This and other advantages of the invention will become apparent from the following specification, with reference to the accompanying drawings, in which.

Figure 1:
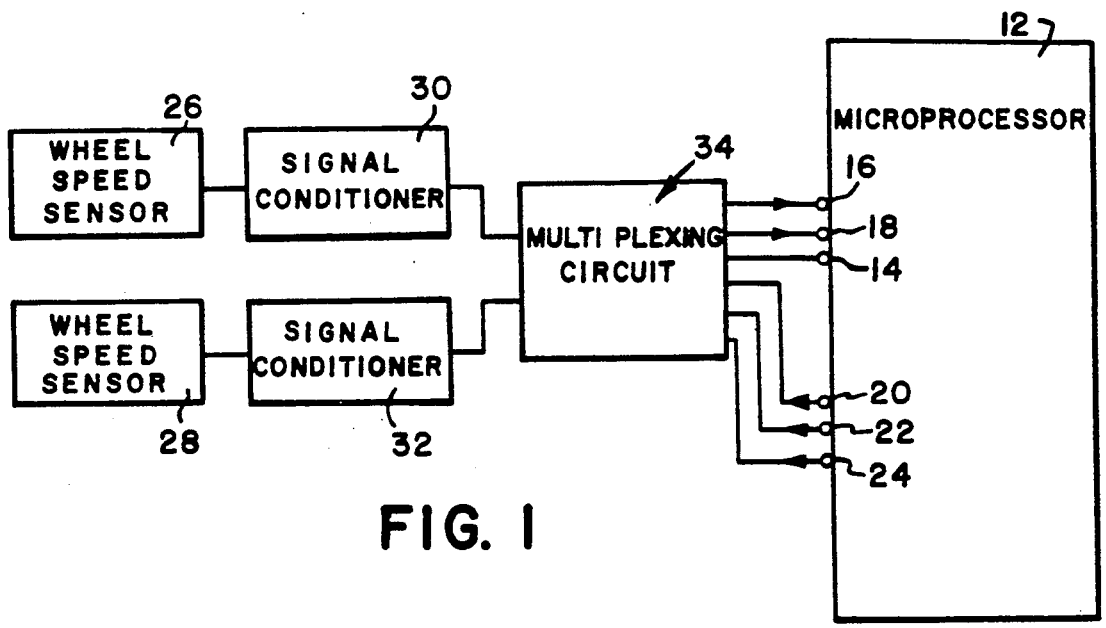
FIG. 1 is a diagrammatic illustration of the processing system made pursuant to the teachings of the present invention.

Referring now to the drawings, a vehicle electronic control system is generally indicated by the numeral 10. The system 10 includes a conventional microprocessor 12, which commonly may be a microprocessor sold by Intel Corporation and designated the "Intel 8096 Microprocessor". Microprocessor 12 includes four high speed input ports, which may be used to receive a high speed input signal, such as a signal representing the speed of a vehicle wheel. Although four such high speed input ports are provided, only one is shown as at 14. Since each of the four high speed input ports or terminals may be used to receive signals from multiplexing systems according to the present invention, only one such port need be shown. The microprocessor 12 further includes input ports 16, 18 for receiving control signals, and output ports 20, 22, and 24, for transmitting control signals. Microprocessor 12 further includes output ports (not shown) for transmitting output signals to effect, for example, a brake pressure decrease or increase in a vehicle adaptive braking system if the microprocessor 12 is used in such a system. Since these brake pressure control devices are responsive to signals from the microprocessor conventional and play no part in the present invention, they will not be described in detail herein. Furthermore, the corresponding ports which operate such devices have been eliminated from the diagrammatic illustration of the microprocessor 12 in FIG. 1.

Figure 4:
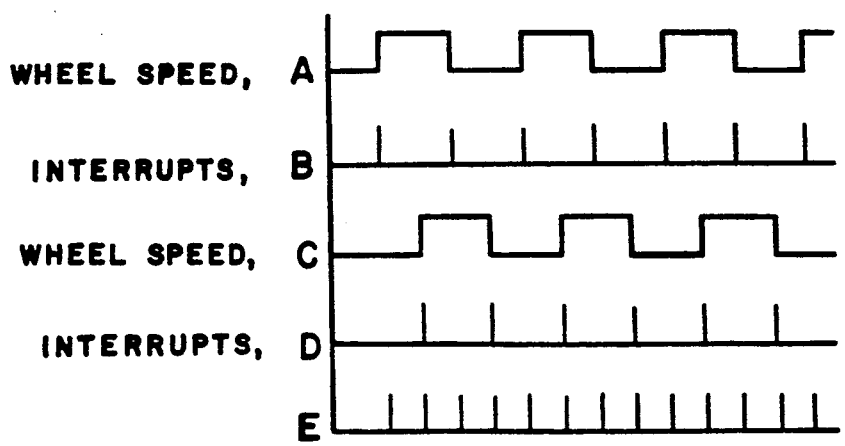
FIG. 4 is a timing diagram illustrating the relationship between the various signals used in the system illustrated in FIGS. 1-2.

System 10 includes conventional wheel speed sensors 26, 28 which generate an output signal which varies as a function of vehicle speed. Normally, wheel speed sensors 26, 28 will consist of an electromagnetic pickup mounted on a non-rotating part of the vehicle adjacent a toothed wheel, commonly called a "tone wheel", which is mounted for rotation with the corresponding wheel of the vehicle. The changes in magnetic flux induced by the changes in mass of the magnetic material of the tone wheel depending upon whether a tooth or a space between adjacent teeth is brought into registry with the magnetic pickup, induces a signal which varies as a function of wheel speed. The signals generated by the wheel speed sensors 26, 28 are passed through conventional signal conditioning circuitry 30, 32, which rectify the signals generated by these wheel speed sensors 26, 28 into the square wave format illustrated at A and C of FIG. 4. The outputs of signal conditioning circuits 30 and 32 are transmitted to a multiplexing circuit generally indicated by numeral 34. The multiplexing circuit 34 consists of hardware devices which control transmission of signals to the ports of the microprocessor 12. The multiplexing circuit is illustrated in detail in FIG. 2.

Figure 2:
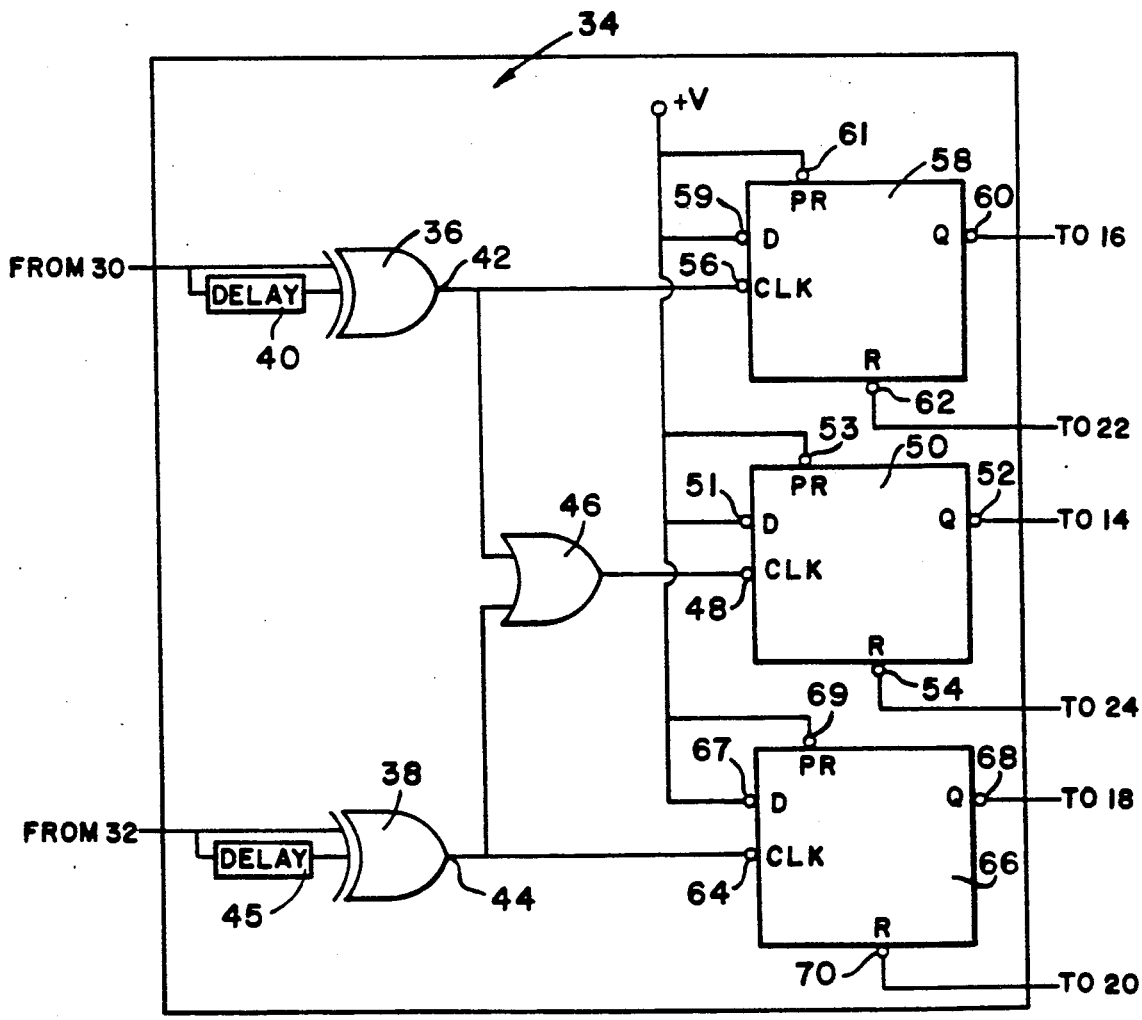
FIG. 2 is a detailed diagrammatic illustration of the multiplexing circuit used in the system illustrated in FIG. 1.

Referring now to FIG. 2, multiplexing circuit 34 includes a pair of exclusive OR gates 36, 38. One input terminal of exclusive OR gate 36 is connected to the output of signal conditioner 30, and the other input of exclusive OR gate is connected to a delay circuit 40 which delays the signal from conditioner 30 to the other input gate of OR gate 36 for a very brief period of time. Accordingly, the signal on the output 42 of exclusive OR gate 36 in response to the square wave output of the signal conditioner 30 will be a series of voltage spikes illustrated on line B of FIG. 4. These voltage spikes represent the low to high and high to low transitions of the square wave output of signal conditioning circuit 30, and are commonly called "interrupts" by those skilled in the art. Similarly, one input of exclusive OR gate 38 is connected directly to the output of signal conditioner 32, and the other input of exclusive OR gate 38 is connected to a delaying circuit 45 which delays the output of signal conditioning circuit 32 for a very brief period of time. Accordingly, the signal at the output 44 of the exclusive OR gate 38 will be a series of interrupts as illustrated on line D of FIG. 4.

Outputs 42, 44 are connected to inputs of an OR gate 46. OR gate 46 generates an output signal whenever an interrupt is generated on the output 42 of exclusive OR gate 36 or on the output 44 of exclusive OR gate 38. The interrupts generated on the output of OR gate 46 are illustrated on line E of FIG. 4. These interrupts are transmitted to the CLK input 48 of a flip-flop or semaphore 50. The D input 51 and preset input 53 of semaphore or flip-flop 50 are connected to a voltage level +V, so that the flip-flop or semaphore 50 is responsive to an input signal on the CLK input 48 to generate a signal on the Q output 52. This signal remains until the flip-flop 50 is reset by a signal from output terminal 24 of microprocessor 12, which is transmitted to the reset input 54 of the flip-flop or semaphore 50. The Q output of flip-flop or semaphore 50 is transmitted to the high speed input terminal 14 of the microprocessor 12.

The output 42 of exclusive OR gate 36 is also connected to the CLK input 56 of another hardware semaphore or flip-flop generally indicated by the numeral 58. The D input 59 and preset input 61 of semaphore or flip-flop 58 are connected to a voltage level +V, so that when a signal is received at CLK input 56, the Q output 60 of semaphore or flip-flop 58 goes high and remains high until the flip-flop or semaphore 58 is reset by receiving a signal at its reset terminal 62 from output terminal 22 of microprocessor 12. The Q output of flip-flop or semaphore 58 is connected to input terminal 16 of microprocessor 12. Similarly, output 44 of exclusive OR gate 38 is connected to the CLK input 64 of a still another hardware semaphore or flip-flop 66. The D input 67 and preset input 69 of semaphore or flip-flop 66 are connected to a voltage level +V, so that flip-flop or semaphore 66 responds to a signal at CLK input terminal 64 to cause the Q output terminal 68 to go high. The Q output terminal 68 remains high until reset by receiving a signal at reset terminal 70 from output terminal 20 of the microprocessor 12. The Q output 68 of hardware semaphore or flip-flop 66 is transmitted to input terminal 18 of microprocessor 12. Again, terminal 14 is a high speed input terminal; the remaining terminals 16, 18, 20, 22, and 24 of microprocessor 12 are control input and output terminals respectively.

Figure 3:
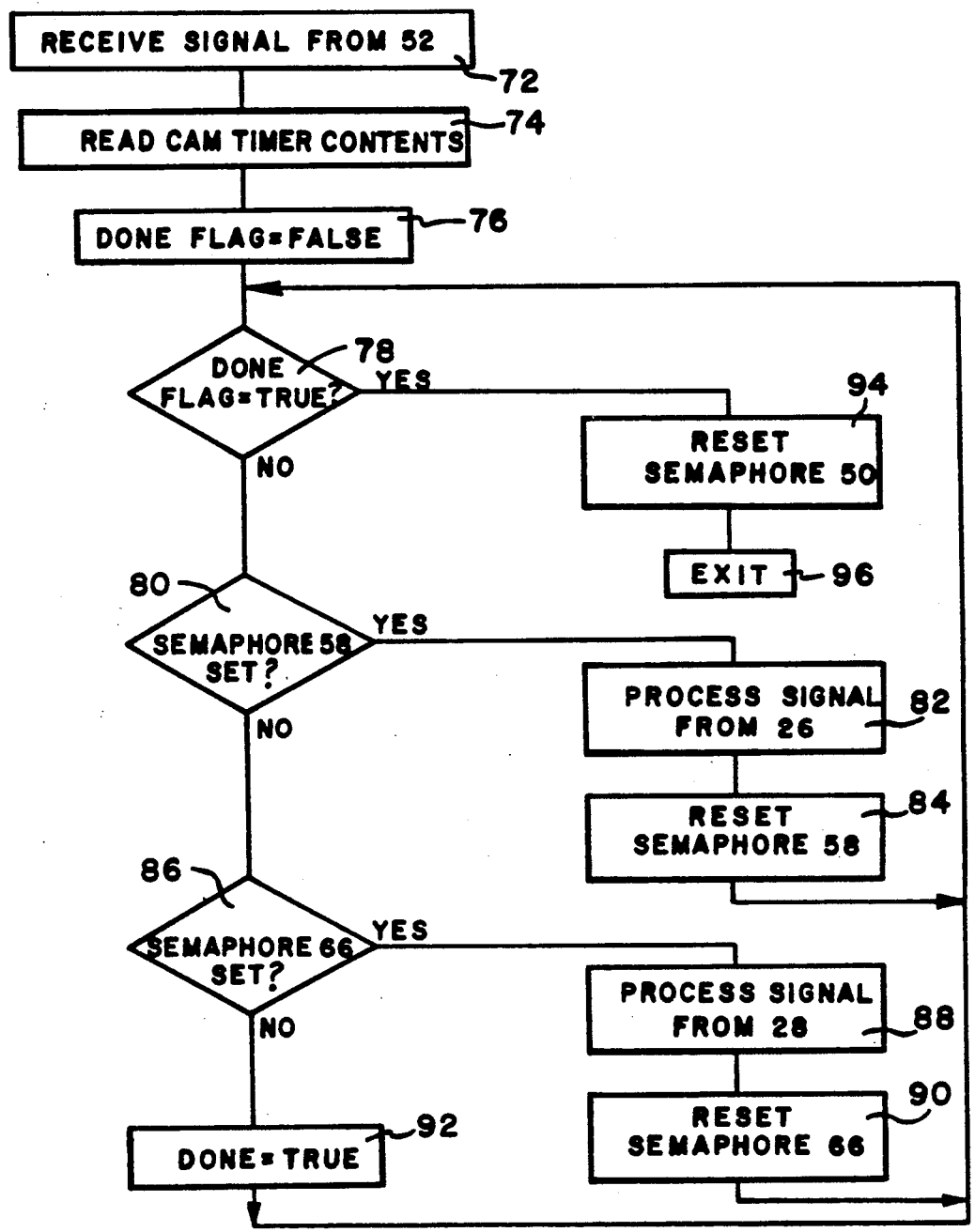
FIG. 3 is a flow chart illustrating the subroutine used by the microprocessor illustrated in FIG. 1 to process speed signals.

The manner in which the microprocessor 12 uses the various signals from the multiplexing circuit 34 to calculate the wheel speed generated by wheel speed sensors 26 and 28 will now be described in detail with reference to FIG. 3. As indicated at 72, when microprocessor 12 receives a signal from Q output 52 of the semaphore or flip-flop 50 on input terminal 14, the subroutine illustrated in FIG. 3 is called. Semaphore or flip-flop 50 is set by the output of OR gate 46, which goes high when an interrupt is generated on either terminal 42 or terminal 44. As indicated at 74, the contents of the CAM timer are then read. The CAM timer is an internal timer within microprocessor 12 that runs continually. The timer is read when the signal from 52 is received, and this time will be used, as will hereinafter be apparent, in the calculation of the instantaneous wheel speed. The internal DONE flag is then set false as indicated at 76. The program then proceeds to decision block 78. Since the DONE flag has just been set as equal to false, the program then proceeds to decision block 80. Decision block 80 tests to see if semaphore 58 has been set. Since the semaphore 50 will have had to been set in order to call the program illustrated in FIG. 3, and since semaphore 50 can be set only if one of the semaphores 58 or 66 is also set, it will be assumed that semaphore 58 will be set. Accordingly, the program then processes the signal on input terminal 14 as an interrupt representing the wheel speed signal from wheel speed sensor 26, as indicated at 82 in FIG. 3. This signal is processed by subtracting the value of the CAM timer stored in memory from the last interrupt process from the current contents of the CAM timer, which was read as indicated at 74. This difference is the time between successive interrupts. Wheel speed may then be calculated in a manner well know to those skilled in the art, by dividing a constant by this time difference. The constant is determined by the diameter of the aforementioned tone wheel, number of teeth on the tone wheel, and the rolling radius of the tire of the wheel for which the wheel speed is being calculated. The semaphore or flip-flop 58 is then reset by generating a signal on terminal 22 of microprocessor 12, as indicated at 84. The program then branches back to test the DONE flag as indicated at 78. Since the DONE flag has not been reset, the program proceeds again to decision block 80. However, since semaphore 58 has just been reset, the program proceeds directly to decision block 86 which tests the semaphore 66.

Normally, semaphores 58 and 66 will not be set at the same time. However, it is possible that if interrupts are generated at 42 and 44 at substantially the same time, both of the flip-flops 58 and 66 will be set. Accordingly, if semaphore 66 has been set, the program branches to 88, where the signal from 28 is processed in the same manner as the signal from 26 was processed in block 82. The current CAM timer contents have been read at 74 and, if both the flip-flops 58 and 66 are set at the same time, the same contents of the CAM timer will be used in the calculations in both blocks 82 and 88. Of course, the values stored in memory for the previous readings of the CAM timer which were used in the calculations will probably be different, so that the instantaneous wheel speeds calculated from wheel speed sensors 26 and 28 will also probably be different. The instantaneous wheel speed, and the CAM timer contents are stored in memory as part of the processing which takes place in blocks 82 and 88. Referring to block 88, after the signal processing is complete, the program continues to block 90, which resets the semaphore 66. The program then branches back to decision block 78. Since the DONE flag has not yet been set equal to reset, the program continues to block 80. Since semaphore 58 has been reset, the program continues to decision block 86. Since semaphore 66 has also been reset, the program continues to set the DONE flag to true, as indicated at 92. The program then branches back to decision block 78. Since the DONE flag is now true, the program then resets semaphore 50, as indicated at 94. The program then exits as indicated at 96, and awaits another cycle in which the semaphore or flip-flop 50 is set.

Accordingly, it will be noted that the microprocessor 12 is able to process an instantaneous wheel speed from both wheel speed sensors 26 and 28, even though only one high speed input terminal 14 has been used. Accordingly, microprocessor 12 having four high speed input terminals can process as many as eight different wheel speeds, although only six wheel speeds are all that are routinely necessary. Accordingly, the complexities discussed hereinabove of using multiple microprocessors are eliminated, not only saving substantial cost, but also saving substantial software complexities necessary for proper interrelating between multiple microprocessors.

I claim:

1. Method of processing two high speed periodic signals through a single interrupt signal input terminal of a microprocessor having an internal timer used for processing both of said periodic signals, said method including the steps of converting one of said high speed signals into a first interrupt signal consisting of a first series of interrupts, converting the other of said high speed signals into a second interrupt signal consisting of a second series of interrupts, transmitting an input signal to said single high speed input terminal for processing by said microprocessor in response to an interrupt from either of said series, transmitting a first control signal to said microprocessor for causing the latter to process said input signal as an interrupt from the first interrupt series if the input signal is caused by an interrupt from said first series, and transmitting a second control signal to said microprocessor for causing the latter to process said input signal as an interrupt from the second interrupt series if the input signal is caused by an interrupt from said second series, said microprocessor reading the current value of said internal timer in response to said input signal regardless of whether the input signal is caused by an interrupt from said first or second series of interrupts, said microprocessor responding to said first and second control signals and using the timer value read from said timer to process said input signal as an interrupt from the first or second series of interrupts depending upon whether the first or the second control signal is generated.

2. Method of processing two high speed periodic signals through a single interrupt signal input terminal of a microprocessor as claimed in claim 1, wherein said timer value read is used to process said input signal both as an interrupt from said first interrupt series and as an interrupt from said second interrupt series if the other control signal is generated before processing of the input in response to generation of either one of said control signals is complete.

3. Method of processing two high speed periodic signals through a single interrupt signal input terminal of a microprocessor as claimed in claim 2, wherein said microprocessor responds to said control signals to store said current value of said timer as a value read for the corresponding interrupt series and determining the difference between the current value of the internal timer read in response to said input signal and the previous value stored in memory for the interrupt series generating the corresponding control signal.

4. Method of processing two high speed periodic signals through a single interrupt signal input terminal of a microprocessor as claimed in claim 3, wherein said input signal is transmitted to said interrupt signal input terminal from the output of an input flip-flop, said method including the step of setting said flip-flop in response to generation of an interrupt from either of said series.

5. Method of processing two high speed periodic signals through a single interrupt signal input terminal of a microprocessor as claimed in claim 3, wherein each of said control signals is transmitted to said microprocessor through a corresponding control flip-flop, said method including the step of setting the corresponding control flip-flop upon generation of an interrupt from a corresponding interrupt series.

6. Method of processing two high speed periodic signals through a single interrupt signal input terminal of a microprocessor as claimed in claim 3, wherein each of said control signals is transmitted to said microprocessor through a corresponding control flip-flop, said method including the step of setting the corresponding control flip-flop upon generation of an interrupt from a corresponding interrupt series and resetting said input flip-flop if both of said control flip-flops are in the reset state.

7. Apparatus for processing two high speed periodic signals through a single interrupt signal input terminal of a microprocessor, said microprocessor having a pair of control ports, a first signal conditioner for converting one of said high speed signals into a first interrupt signal consisting of a first series of interrupts, a second signal conditioner for converting the other of said high speed signals into a second interrupt signal consisting of a second series of interrupts, an input flip-flop connected to said interrupt signal input terminal, said input flip-flop being set in response to an interrupt from either of said first or second series of interrupts, a first control flip-flop having an output terminal connected to one of said control ports, said first control flip-flop being set to transmit a first control signal to said one control port in response to an interrupt from said first series of interrupts, said first control signal causing the microprocessor to process the signal received through said interrupt signal input terminal as an interrupt from said first series, and a second control flip-flop having an output terminal connected to the other control port, said second control flip-flop being set to transmit a second control signal to said other control port in response to an interrupt from said second series of interrupts for causing the microprocessor to process the signal received through said interrupt signal input terminal as an interrupt from said second series.

8. Apparatus for processing two high speed periodic signals through a single interrupt signal input terminal of a microprocessor as claimed in claim 7, wherein said microprocessor includes a first output port for transmitting a reset signal to said first control flip-flop upon completion of processing of an input signal as an interrupt from said first series and a second output port for transmitting a reset signal to said first control flip-flop upon completion of processing of an input signal as an interrupt from said second series.

9. Apparatus for processing two high speed periodic signals through a single interrupt signal input terminal of a microprocessor as claimed in claim 8, wherein said microprocessor includes a third control port for transmitting a reset signal to said input flip-flop when both of said control flip-flops are reset.

10. Apparatus for processing two high speed periodic signals through a single interrupt signal input terminal of a microprocessor as claimed in claim 7, wherein said microprocessor includes an internal timer, said microprocessor responding to said first control signal to read said timer in response to said input signal and to use the value of the timer read to processes said input signal as an interrupt from said first series and responding to said second control signal to read said timer in response to said input signal and to use the value of the timer read to processes said input signal as an interrupt from said second series.

* * * * *